United States Patent [19]

Sombrio

[11] Patent Number: 5,476,673

[45] Date of Patent: Dec. 19, 1995

[54] FOOD TRANSPORTATION METHOD

[76] Inventor: Gerald J. Sombrio, 289 Stonybrook Way NE, Fridley, Minn. 55432

[21] Appl. No.: 357,541

[22] Filed: Dec. 16, 1994

Related U.S. Application Data

[63] Continuation of Ser. No. 77,314, Jun. 15, 1993, abandoned, which is a continuation of Ser. No. 836,990, Feb. 14, 1992, abandoned, which is a continuation-in-part of Ser. No. 563,102, Aug. 3, 1990, abandoned.

[51] Int. Cl.$^6$ .............................. B65B 43/00; B65B 51/00
[52] U.S. Cl. .............................. 426/410; 53/413; 53/416; 426/413; 426/414
[58] Field of Search ...................... 426/394, 414, 426/129, 140, 413, 105, 410, 110, 130, 138, 92; 53/363, 138.2, 417, 413, 416; 294/137, 150; 452/30, 32, 183, 51; 206/526; 303/10; 493/214; 138/118, 118.1

[56] References Cited

U.S. PATENT DOCUMENTS

| | | | |
|---|---|---|---|
| 1,505,218 | 8/1924 | Sartore . | |
| 1,508,155 | 9/1924 | Berg . | |
| 1,873,286 | 8/1932 | Chase . | |
| 2,042,227 | 5/1936 | Hensel | 99/175 |
| 2,129,832 | 9/1938 | Eckrich et al. | 426/105 |
| 2,225,694 | 12/1940 | Freeman | 426/105 |
| 2,247,312 | 6/1941 | Rumsey, Jr. | 99/174 |
| 2,670,294 | 2/1954 | Frank | 426/105 |
| 2,981,990 | 5/1961 | Balderree, Jr. | 24/30.5 |
| 3,064,803 | 11/1962 | Eichin et al. | 206/65 |
| 3,095,308 | 6/1963 | Rumsey, Jr. | 426/414 |
| 3,499,259 | 3/1970 | Tipper et al. | 53/14 |
| 3,635,738 | 1/1972 | Hofmann et al. | 99/169 |
| 3,798,336 | 3/1974 | Hawley | 426/279 |
| 3,891,775 | 6/1975 | Murray et al. | 426/107 |
| 4,247,005 | 1/1981 | Buxton | 206/525 |
| 4,470,171 | 9/1984 | Rusmussen et al. | 426/105 |

Primary Examiner—Anthony J. Weier
Attorney, Agent, or Firm—Nawrocki, Rooney & Sivertson

[57] ABSTRACT

A method for processing a single food product through a food processing plant. The method comprises the steps of providing a length of casing, wherein the casing has a first end and a second end. The casing further has sufficient inherent strength as provided to support a selected food product. The first end of said casing is then capped and a food product is provided. The food product is of selected size to fill approximately three-quarters of the length of the casing. The food product is inserted into the casing through the second end and a pair of clips are provided. The first clip and the second clip are each radially receivable over the exterior surface of the casing. The casing is then clipped proximate the second end of the casing utilizing the first clip and the casing is clipped proximate the food product utilizing the second clip. The casing is then cut longitudinally between the first and second clip to create handling means. A means for transporting the food product is then provided and the food product suspended by said handling means and transported through the stages of a food processing plant.

8 Claims, 1 Drawing Sheet

FOOD TRANSPORTATION METHOD

This application is a continuation of U.S. Ser. No. 08/077,314, filed Jun. 15, 1993, which is a continuation of U.S. Ser. No. 836,990, filed Feb. 14, 1992, which is a continuation-in-part of U.S. Ser. No. 07/563,102, filed Aug. 3, 1990, now all abandoned.

BACKGROUND OF THE INVENTION

This invention relates to the food preparation industry. More specifically, it relates to assemblies or apparatuses useful for transporting food products. Yet more specifically, this invention relates to methods and apparatuses useful for transporting in-preparation food.

DESCRIPTION OF THE PRIOR ART

U.S. Pat. No. 3,499,259 to Maynard J. G. Tipper et al. shows a method of packaging meat and poultry products wherein a flexible wrapper is gathered into a rope-like extension at one end of the package, formed into a loop and clipped in place to form a carrying handle. The invention of Tipper et al. requires the utilization of a substantial excess of relatively expensive, flexible wrap. The flexible wrap disclosed by Tipper et al. is "stockinette" or VEXAR.

U.S. Pat. No. 3,635,738 to Robert G. Hofmann et al. discloses a packaged meat product involving a composite casing. The problem dealt with by Hofmann et al. was avoiding utilization of natural casing.

U.S. Pat. No. 3,064,803 to Harry P. Eichin et al. discloses a pleated pre-tied sausage casing made from a flattened synthetic and preferrably cellulosic tubing of desired length and diameter by pleating the full length of the casing and forming a closure at one end, preferrably having an attached casing hanger.

U.S. Pat. No. 2,247,312 to Herbert Rumsey, Jr. discloses an improved meat packing process. The packing process of Rumsey relates particularly to methods of molding meat products such as pork butts. The process generally contemplates the application of pressure to round the ends of the pork butts as well as the sides of the pork food product to impart a desirable, substantially cylindrical shape thereto.

U.S. Pat. No. 2,042,227 to Henry A. Hensel relates to sausage casings and a method and apparatus for closing same. Hensel discloses the use of a plurality of perforations adjacent one end of the casing to facilitate its closing or knotting.

U.S. Pat. No. 4,247,005 to Larry E. Buxton discloses a package and packaging method wherein strapping is used in conjunction with tubular packaging material to form a handle.

U.S. Pat. No. 1,505,218 to Laurence Sartore discloses a method of stuffing sausages wherein a sausage casing is closed at one end and covered with a reticulated fabric.

U.S. Pat. No. 1,508,155 to Jacob H. Berg discloses a meat-food product and method of making same which involves the treatment of the casing to make both the casing and the food product therein edible. The invention of Berg involves treatment of the casing, e.g., by pickling, so as to make it, as well as the food contained therein, palatable.

None of the above patents, alone or in combination disclose or suggest the present invention.

SUMMARY OF THE INVENTION

Briefly, in one aspect, the present invention is a method of transporting food product. In a further aspect, the present invention is a method of creating a means, article, or apparatus for transporting a food product. The apparatus or article produced in the practice of this method (including the article with food product therein) also is an aspect of this invention. The transportation method of the present invention comprises the steps of providing a segment, or portion of, a food product casing which is sufficiently strong so as to transport the food product when it is enclosed therein and providing the food product to be transported. In practice, it has been found that the natural longitudinal strength of a food product casing is enhanced by clipping the casing as described herein. The next step of this method involves, alternatively, closing the casing to create a clipped or capped first end of the assembly or inserting or introducing the food product into the casing until it is located proximate the first end of the casing and then capping the open end of said first end. In the next step, the casing is clipped after, or behind, the food product to enclose the food product within the casing and to create a first following clip. The next step then, is clipping the casing a second time after the food product to create a second following clip, the second clip being separated from said first clip a distance which is appropriate for the device with which the present transportation means or apparatus is to be used. Next, the method involves longitudinally cutting or slicing the casing between the first and second following clips to create a transportation means, e.g., a handle, from said casing and transporting the food product by the selected transportation means.

Subsequent to the steps above, the article of the present invention is used in a step of transporting in-process food. In this step, the article, is, for example, placed upon a hook, smoke house stick, "tree limb", or other support mechanism to transport the food product to other points within a food processing plant. In this practice of the invention, it is necessary to focus upon the mechanism that is to be employed after and in conjunction with the present invention to determine the distance between the first and second following clips. For example, if a one-inch diameter hook, smoke house stick or tree limb is employed, e.g., to transport a ham which is to be smoked, then the distance between the first and second following clips would be about one-inch. Where other mechanisms are employed with the present invention to transport food products, the distance between the first and second following clips would be accordingly adjusted.

In another aspect of this invention, the casing may be clipped and longitudinally sliced by the casing manufacturer. In this practice, the first and second following clips are placed around a segment of casing, appropriately separated, leaving one end open. The casing then is longitudinally sliced between the first and second clips and sent to a food processing plant. At the plant, a food product is introduced into the casing and the casing is clipped or capped adjacent its open end to complete the assembly.

The term "food product" is used extensively herein. This term is to be interpreted broadly to include any and all of the foods commonly processed which require handling or transportation in a casing. This invention relates most closely to the meat packing industry. Exemplary but by no means limiting examples of food product include hams, turkeys, sausages, processed meats such as hamburger or bologna or any other types of meat products which require transportation in their preparation, e.g., for cooking or smoking, or subsequent shipment.

The term "clipping" also is used extensively herein. This term is intended to be broadly understood to mean clipping, stapling, encircling or other words meaning the casing is, in some sense, gathered and held.

DETAILED DESCRIPTION OF THE INVENTION

The present invention is an improved method of transporting food products which are in preparation or which are being shipped. This invention eliminates the need to purchase what is commonly referred to in the industry as a "stockinette" which is to be unrolled (e.g., U.S. Pat. No. 3,499,259, above) over a food product casing. The stockinette is used to transport food product during processing and is often discarded prior to shipment to retail outlets. In addition to eliminating the usually manual steps of unrolling a stockinette over a casing, the cost of the stockinette itself is eliminated in the food preparation process. Conventionally, strings also have been attached to one end of a casing to provide an attachment means or transportation means. Disposal of either or both of an intermediate, spent stockinette or string has presented significant environmental and land fill problems.

Figure 1:
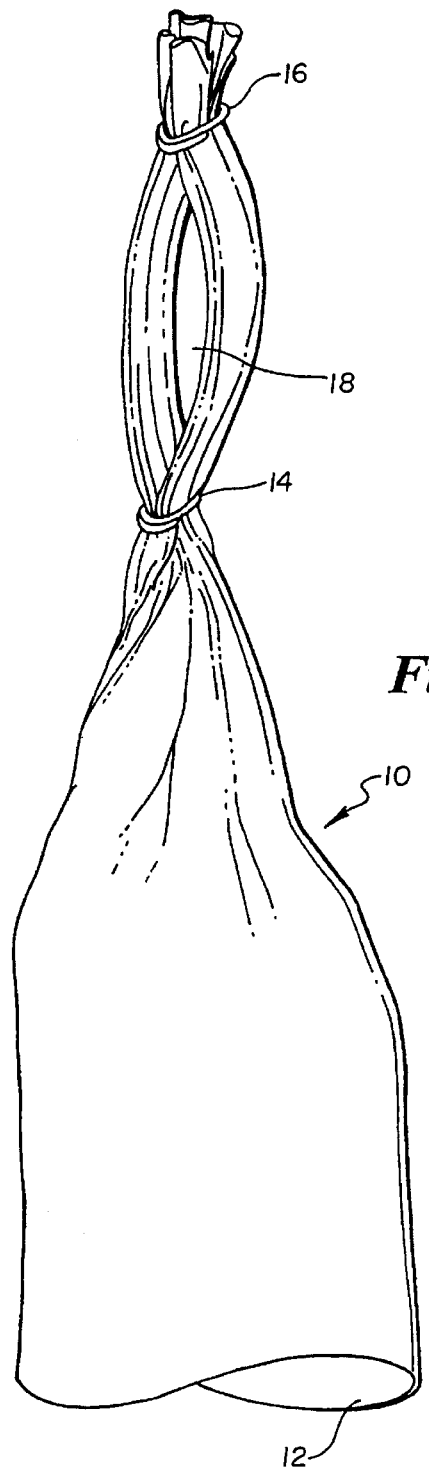
FIG. 1 is a fragmentary perspective view showing an article of the present invention.

Reference now is made to figures wherein like numerals are used to refer to like features of the invention in the various figures. FIG. 1 depicts a casing 10 such as would result in a practice of the method of the present invention. Casing 10 consists of either artificial or synenic casing material as above-described. Casing 10 has an opening 12 and first and second following clips or bands 14 and 16, respectively. Also as shown in FIG. 1, casing 10 has been split or cut between clips 14 and 16 to provide an opening or handle 18. The article as shown in FIG. 1 could be produced at a casing plant and subsequently shipped to a food processing plant. At the food processing plant, food product would be inserted in opening 12 and casing 10 would be clipped or capped adjacent that opening. So, for example, a ham would be slipped into opening 12 and a metallic clip, staple, or wire attached adjacent thereto so as to enclose the ham within casing 10. By means of opening 18, the assembly would then be used to transport food product or ham contained therein.

Figure 2:
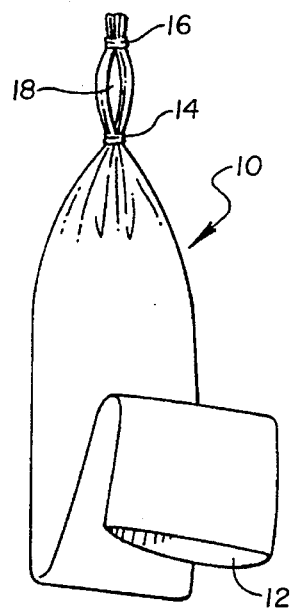
FIG. 2 is a side pictorial view thereof with casing folded and ready for filling.

FIG. 2 depicts a second view of an article of the present invention with a longer tubular portion of the casing such as might be used for packaging bologna.

Figure 3:
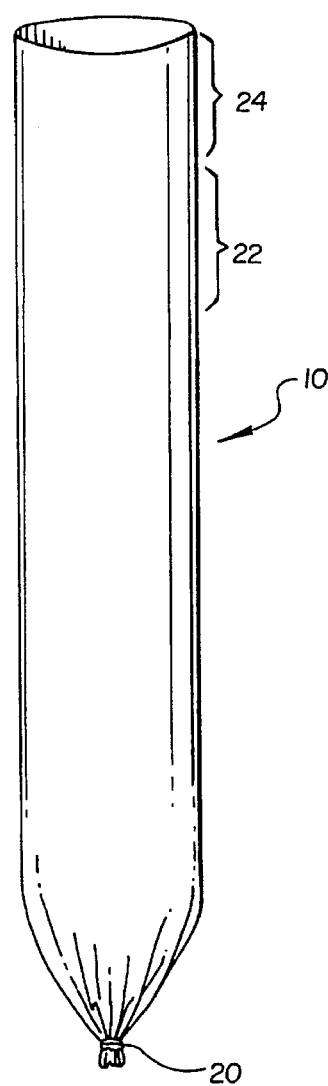
FIG. 3 is a side pictorial view thereof with casing closed at one end with common binding ready for filling and closing utilizing the method of this invention.

FIG. 3 depicts an article of the present invention as it would appear in the more usual practice of the present invention. In FIG. 3, casing 10 would first be clipped or capped 20 adjacent one end thereof. Casing 10 would then be filled with an appropriate food product (not shown). Assuming the appropriate food product filled casing 10 approximately three-quarters of its length, then at approximately regions 22 and 24, casing 10 would be gathered and first and second following clips would be placed therearound. Note that the order of placement of the first and second following clips at regions 22 or 24 is not critical as long as both clips are employed. However, in the normal practice, a first following clip would be placed at region 22 of casing 10 with the second following clip being placed at region 24. Subsequent to placement of the two following clips, casing 10 then would be split or sliced between the two following clips.

Figure 4:
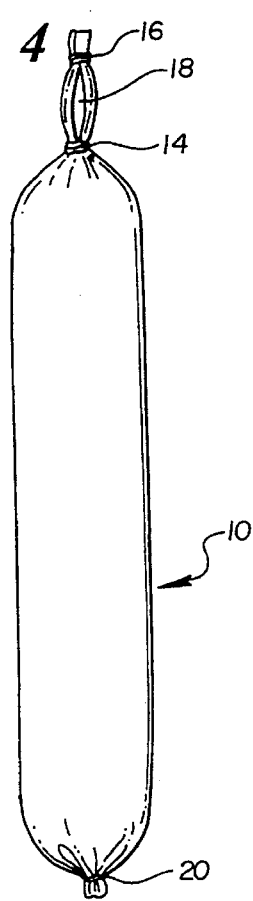
FIG. 4 is a completed article of the present invention with food product therein.

FIG. 4 shows the completed article of FIG. 3 with food product contained therein. The handle means or transportation means created by following clips 14 and 16 and the opening 18 produced when casing 10 is sliced therebetween provides a convenient means to transport food product with all the attendant cost savings and advantages described herein.

This invention can be used with either artificial or natural casings. The casings must be adequately reinforced or treated or be of sufficient inherent strength so that when longitudinally sliced in the method hereof, the resulting handle is strong enough to transport the food product then contained therein. While casing longitudinal strength tends to increase when gathered and stapled, a minimal, longitudinal rigidity is required. The strength of common casings is usually sufficient to practice this invention without modification.

The selection of either natural of synthetic casings is also somewhat dependent upon the particular food product. For example, if bologna is to be transported with the article of the present invention, either a natural or synthetic casing may be used. If, for example, ham is to be transported, then it is likely that a synthetic casing would be employed.

It should also be noted that the selection of casing is also dependent upon the point in the food preparation process where the present article or method is to be utilized. In the case of, for example, ham, it is likely that the article of the present invention would be employed within the food processing plant. The in-process ham would then be repackaged for later sale.

There are many varieties of casings within the contemplation of the present invention. For example, commercially available casings usable in the present invention include Supralon PVDC, Collarain, COLLAGEN MOISTURE BARRIER FIBROUS CASING, HUKKI COLLAGEN and SCF FRAN POLYMERIC CASING, all commercially available from Vista International Packaging of Kenosha, Wis. One of skill in this art will recognize that there are many possible casings which could be employed in the practice of this invention.

It should be recognized that there are likely to be various other steps which are practiced in conjunction with the method/apparatus of the present invention. For example, particular casings may require a pre or post treatment step or steps to make them suitable for use in the present invention. Casings are commonly soaked in water to make them flexible and conformable to the food product around which they are to be placed. Before, during and after practice of the steps of the present method, further food treatment steps may be employed. An example of such practice would be the use of a particular casing in conjunction with a smoke treatment step to produce a smoked food product. Cooking of a food product in an assembly of the present invention also is contemplated. Selection of particular casings usable in conjunction with a smoke treatment step or a cooking step is clearly within the skill of one knowledgable in this art.

Practice of the present invention permits reduced utilization of water. For example, subsequent to a heating step to kill trichinosis, hams are extensively rinsed to remove unwanted grease which has permeated therefrom. Conventional rinsing steps where a stockinette are involved require unwanted material to be rinsed from both the stockinette (which is then discarded) and the exterior of the casing. By elimination of the stockinette, the present invention permits such treated food product to be rinsed in less time, thereby using less water. By this expedient, adverse environmental impact of food processing (i.e., wasting of water) is reduced. As has been referred to above, the practice of the invention presents additional savings by eliminating spent or used packaging such as stockinettes or string. Labor costs are reduced by the manual steps that are eliminated. Lastly adverse environmental consequences of discarded packaging are reduced or eliminated.

Manipulations necessary to deploy a food product into a casing other than as is claimed herein are conventional. For example, U.S. Pat. No. 3,499,259 (the disclosure of which is incorporated herein) describes a conventional food product packaging line. FIGS. 8 and 9 of the '259 patent generally depict a food processing apparatus which could, in part, employ the present invention. FIGS. 10, 11 and 12 of the '259 patent depict clips or staples that could be utilized in a practice of the present invention as well as the mechanism used to place them.

As with other meat or food processing assemblies, the present method may be performed manually or it may be done by machine. A particular mechanism that would employ the steps of the present invention would be largely conventional with the exception that the ordered steps or apparatus of this invention would be employed.

An unexpected advantage achieved in the practice of this invention is that the resulting encased food product tends to hang more uniformly. Food product in a casing of this invention tends to center itself within the casing and thereby provides a more desirable and pleasing appearance. Uniform distribution of the weight of the food product in the article also means the casing itself is optimally utilized to cover the food product. Unfilled voids which waste casing are reduced or eliminated. Optimum utilization of the casing itself thereby results.

Many modifications and variations of the present invention will become readily obvious to one of skill in this art in view of the above disclosure. These modifications and variations are within the scope of the attached claims.

What is claimed is:

1. A method for processing a single food product through stages of a food processing plant, said method comprising the steps of:
   (a) providing a length of casing, said casing having a first end and a second end, said casing further having sufficient inherent strength, as provided, to support a selected food product;
   (b) capping the first end of said casing;
   (c) providing said food product, said food product of selected size to fill approximately three quarters of the length of said casing;
   (d) inserting said food product into said casing through said second end of said casing;
   (e) providing a pair of clips, said first clip and said second clip each radially receivable over the exterior surface of said casing;
   (f) clipping said casing proximate said second end of said casing utilizing said first clip and clipping said casing proximate said food product utilizing said second clip;
   (g) cutting said casing longitudinally between said first and said second clip to create a handling means for transporting said encased single food product, wherein the combination of said casing, said cap and said pair of clips form the only structure for supporting said food product through stages of said food processing plant; and
   (h) providing means for transporting said food product through a food processing plant, suspending said food product by said handling means from said means for transporting and transporting said food product through stages of a food processing plant.

2. The method of claim 1, wherein said food product is a meat product which is non-ground.

3. The method of claim 1, wherein said first and said second clip are spaced apart by approximately one inch.

4. The method of claim 1, wherein said clips used are staples.

5. A method for processing a single food product through stages of a food processing plant, said method comprising the steps of:
   (a) providing a length of casing, said casing having a first end and a second end, said casing further having sufficient inherent strength, as provided, to support a selected food product;
   (b) providing said food product, said food product of a selected size to fill approximately three quarters of the length of said casing;
   (c) providing a pair of clips, said first clip and said second clip each radially receivable over the exterior surface of said casing;
   (d) clipping said casing proximate said second end of said casing utilizing said first clip and clipping said casing proximate said food product utilizing said second clip;
   (e) cutting said casing longitudinally between said first and second clip to create a handling means for transporting said filled casing;
   (f) inserting said food product into said casing through said first end of said casing;
   (g) capping the first end of said casing wherein the combination of said casing, said pair of clips and said cap form the only structure for supporting said food product through stages of said food processing plant, and
   (h) providing means for transporting said food product through a food processing plant, suspending said food product by said handling means and transporting said food product through stages of said food processing plant.

6. The method of claim 5, wherein said food product is a meat product which is non-ground.

7. The method of claim 5, wherein said first and said second clip are spaced apart by approximately one inch.

8. The method of claim 5, wherein said clips used are staples.

* * * * *